(12) United States Patent
Shaked

(10) Patent No.: US 7,760,943 B2
(45) Date of Patent: Jul. 20, 2010

(54) METHOD TO SPEED-UP RETINEX-TYPE ALGORITHMS

(75) Inventor: Doron Shaked, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1908 days.

(21) Appl. No.: 10/675,944

(22) Filed: Oct. 2, 2003

(65) Prior Publication Data

US 2005/0074163 A1    Apr. 7, 2005

(51) Int. Cl.
*G06K 9/40* (2006.01)

(52) U.S. Cl. .................. 382/174; 382/167; 382/254; 382/260

(58) Field of Classification Search ................ 382/254, 382/260, 274.167
See application file for complete search history.

(56) References Cited

U.S. PATENT DOCUMENTS

| | | | |
|---|---|---|---|
| 4,384,336 A | 5/1983 | Frankle et al. | 382/49 |
| 4,649,568 A | 3/1987 | Kiesel et al. | 382/41 |
| 5,406,334 A * | 4/1995 | Kondo et al. | 348/581 |
| 5,991,456 A | 11/1999 | Rahman et al. | |
| 6,347,156 B1 * | 2/2002 | Kamada et al. | 382/237 |
| 6,392,765 B1 * | 5/2002 | Sakaida | 358/525 |
| 6,760,484 B1 * | 7/2004 | Sobol | 382/254 |
| 6,788,822 B1 * | 9/2004 | Zhang et al. | 382/254 |
| 6,804,409 B2 * | 10/2004 | Sobol et al. | 382/274 |
| 6,807,299 B2 * | 10/2004 | Sobol | 382/166 |
| 6,813,041 B1 * | 11/2004 | Moroney et al. | 358/1.9 |
| 6,842,543 B2 * | 1/2005 | Woodell et al. | 382/274 |
| 6,882,449 B2 * | 4/2005 | Kimmel et al. | 358/1.9 |
| 6,937,772 B2 * | 8/2005 | Gindele | 382/240 |
| 6,941,028 B2 * | 9/2005 | Kimmel et al. | 382/274 |
| 6,947,176 B1 * | 9/2005 | Kubo et al. | 358/1.9 |
| 6,961,481 B2 * | 11/2005 | Lee et al. | 382/300 |
| 6,987,544 B2 * | 1/2006 | Ogata et al. | 348/678 |
| 7,046,858 B2 * | 5/2006 | Sobol | 382/274 |
| 2004/0091164 A1 * | 5/2004 | Sakatani et al. | 382/254 |

FOREIGN PATENT DOCUMENTS

WO    WO02/089062    11/2002

OTHER PUBLICATIONS

Alter-Gartenberg et al., "Assessment of the Wiener-Retinex process," Applied Optics, vol. 41, No. 23, pp. 4783-4805, Aug. 2002.*
Ramponi et al., "Nonlinear Contrast Enhancement Based on the Retinex Approach," Proc. of SPIE vol. 5014, pp. 169-177, 2003.*

(Continued)

*Primary Examiner*—Bhavesh M Mehta
*Assistant Examiner*—Sean Motsinger

(57) ABSTRACT

An apparatus, and a corresponding method, are usable for speeding up Retinex processing of an input image. The apparatus includes a down sample module having a sub-sampling algorithm, where sub-sampled images of the input image are produced, and a non-linear illumination estimation module that receives the sub-sampled images and produces corresponding interim illumination estimations. Finally, the apparatus includes an up sample module including one or more up-sampling algorithms. The interim illumination estimations are interpolated to produce an illumination estimation, and the illumination estimation is usable to perform a Retinex correction to the input image.

21 Claims, 7 Drawing Sheets

OTHER PUBLICATIONS

Elad et al., "Reduced complexity Retinex algorithm via the variational approach," Journal of Visual Communication and Image Representation 14, pp. 369-388, 2003.*

Ogata et al., "Dynamic range compression based on illumination compensation," IEEE Transactions on Consumer electronics, vol. 47, No. 3, pp. 548-558, Aug. 2001.*

A. Blake, "Boundary Conditions of Lightness Computation in Mondrian World," *Computer Vision Graphics and Image Processing*, vol. 32, pp. 314-327, 1985.

J. M. DiCarlo et al., "Rendering High Dynamic Range Images," *Proc. SPIE*, vol. 3965, pp. 392-401, 2000.

F. Durand, et al., "Fast Bilateral Filtering for the Display of High Dynamic Range Images," preprint <http://graphics.lcs.mit.edu/~fredo/DurandBilateral.pdf>, 2002.

O. D. Faugeras, "Digital Image Color Processing Within the Framework of a Human Visual Model," *IEEE Trans. on ASSP*, vol. 27, pp. 380-393, 1979.

B. Funt et al., "Retinex in Matlab," *Proc. of IS&T 8th Color Imaging Conference*, pp. 112-121, 2000.

B. K. P. Horn, "Determining Lightness from an Image," *Computer Graphics and Image Processing*, vol. 3, pp. 277-299, 1974.

D. J. Jobson et al., "A Multiscale Retinex for Bridging the Gap Between Color Images and the Human Observation of Scenes," *IEEE Trans. on Image Proc.*, vol. 6, pp. 965-976, 1997.

R. Kimmel et al., "A Variational Framework for Retinex," *Hewlett Packard Technical Report HPL-1999-151*, Jun. 1999.

R. Kimmel et al., "Space Sensitive Color Gamut Mapping: A Variational Approach," *Hewlett Packard Technical Report HPL-2000-50*, Apr. 2000.

E. H. Land, "Recent Advances in the Retinex Theory and Some Implications for Cortical Computations: Color Vision and the Natural Image," *Proc. National Academy of Science USA*, vol. 80, pp. 5163-5169, 1983.

E. H. Land, "An Alternative Technique for the Computation of the Designator in the Retinex Theory of Color Vision," *Proc. National Academy of Science USA*, vol. 83, pp. 3078-3080, 1986.

E. H. Land et al., "Lightness and the Retinex Theory," *J. Optical Soc. of America A*, vol. 61, pp. 1-11, 1971.

J. McCann, "Lessons Learned from Mondrians Applied to Real Images and Color Gamuts," *Proc. IS&T/SID 7th Color Imaging Conference*, pp. 1-8, 1999.

J. McCann et al., "Demonstration Red/White Projections and Red-Leone Color," *Proc. of SPIE*, vol. 4662, pp. 324-330, Jan. 2002.

J. McCann et al., "Capturing a Black Cat in Shade: The Past and Present of Retinex Color Appearance Models," *Proc. of SPIE*, vol. 4662, pp. 321-340, Jan. 2002.

R. Sobol, "Improving the Retinex Algorithm for Rendering Wide Dynamic Range Photographs," *Proc. of SPIE*, vol. 4662, pp. 341-3487, 2002.

T. G. Stockham, Jr., "Image Processing in the Context of a Visual Model," *Proc. of the IEEE*, vol. 60, pp. 828-842, 1972.

J. Tumblin et al., "Two Methods for Display of High Contrast Images," *ACM Trans. on Graphics*, vol. 18, pp. 56-94, 1999.

J. Tumblin et al., "LCIS: A Boundary Hierarchy for Detail-Preserving Contrast Reduction," *SIGGRAPH*, pp. 83-90, 1999.

D. Terzopoulos, "Image Analysis Using Multigrid Relaxation Methods," *IEEE Trans. on PAMI*, vol. 8, pp. 129-139, 1986.

Moore A et al: "A Real-Time Neural System for Color Constancy" IEEE Transactions on Neuural Networks, IEEE Inc., New York, US, vol. 2 No. 2, Mar. 1, 1991 pp. 237-247 XP000202577.

* cited by examiner

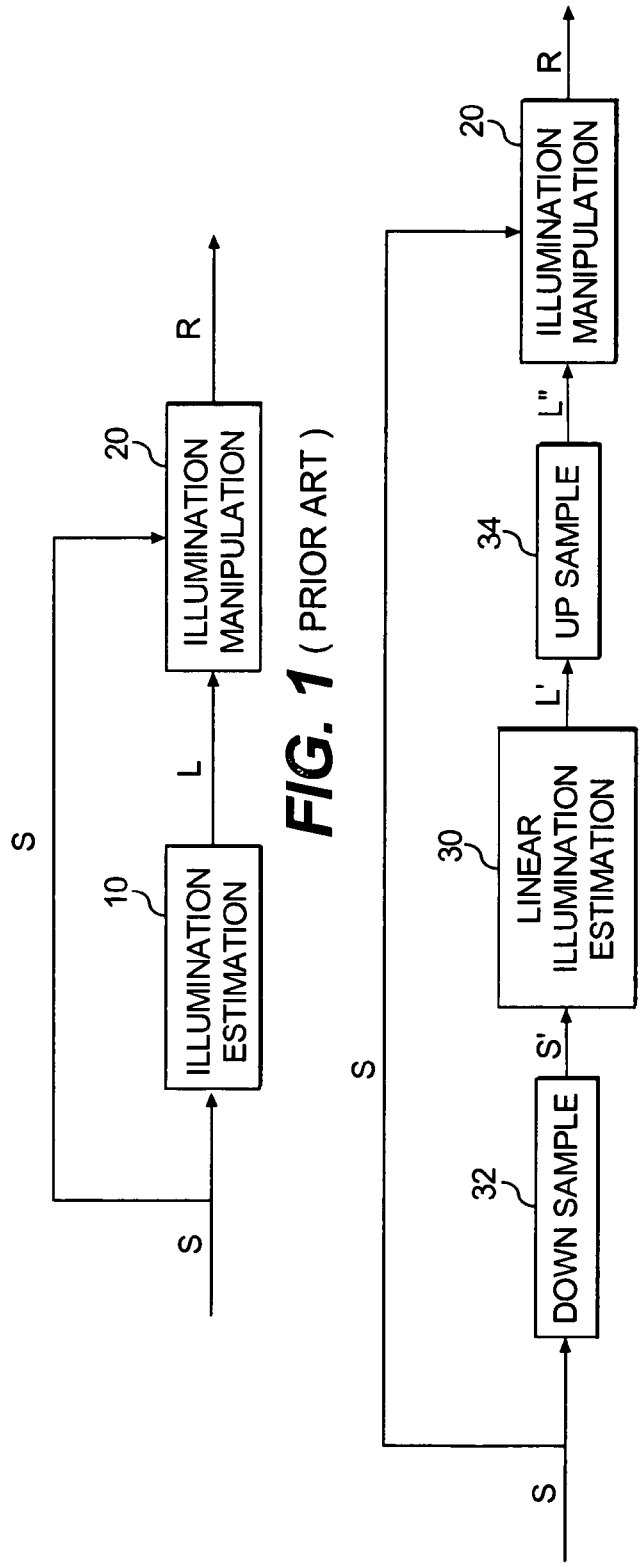

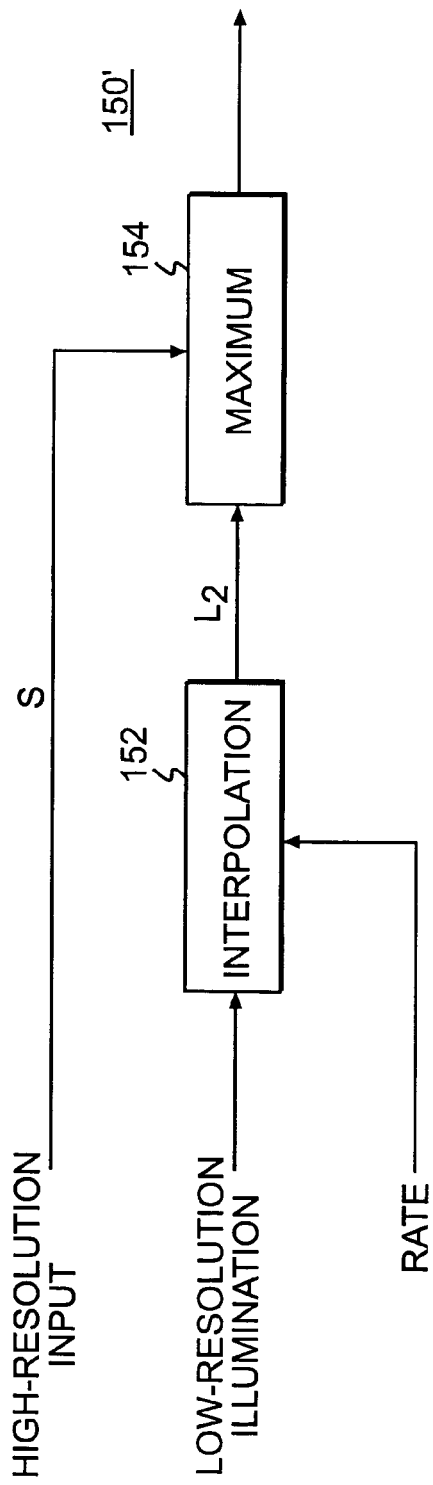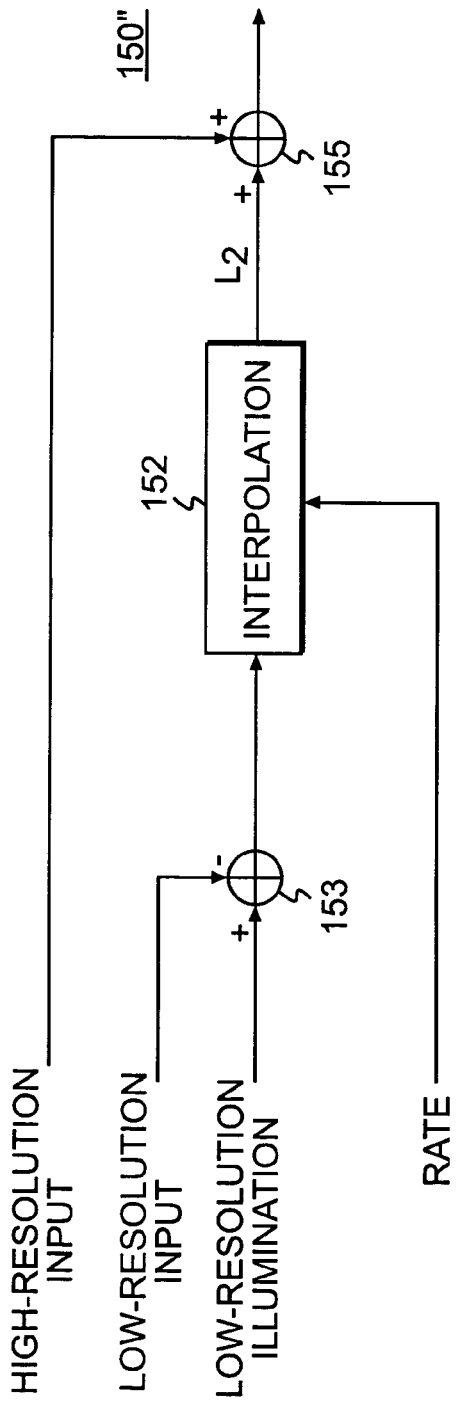
FIG. 4a
FIG. 4b

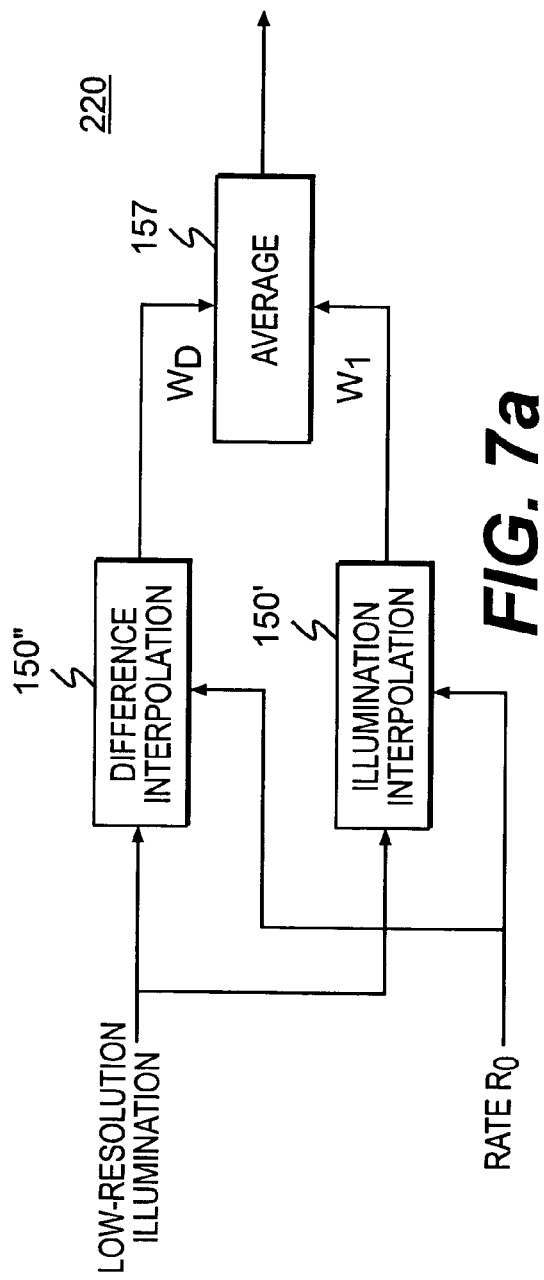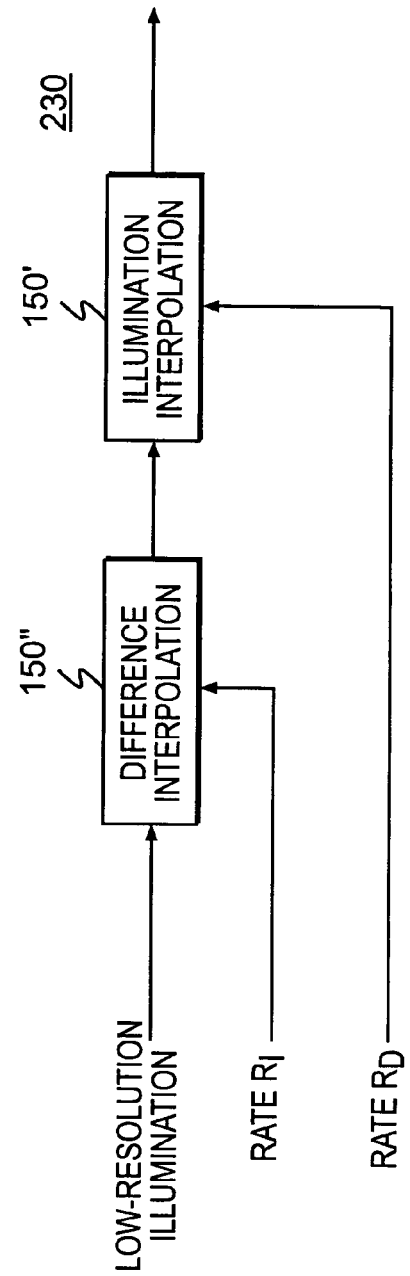

METHOD TO SPEED-UP RETINEX-TYPE ALGORITHMS

TECHNICAL FIELD

The technical field is color vision correction, and more particularly color vision correction using Retinex-type algorithms.

BACKGROUND

A theory of human vision centered on the concept of a center/surround Retinex (retina and cortex) was introduced by Edwin Land in "An Alternative Technique for the Computation of the Designator in the Retinex Theory of Color Vision," Proceedings of the National Academy of Science, Volume 83, pp. 3078-3080, 1986. Land drew upon his earlier Retinex concepts disclosed in "Color Vision and The Natural Image," Proceedings of the National Academy of Science, Volume 45, pp. 115-129, 1959, but harmonized these with certain findings of the neurophysiology of vision. All of the Retinex concepts were intended to be models for human color perception.

The application of Land's human vision theories to image processing has been attempted in the prior art. For example, to mimic the dynamic range compression of human vision, a detector array with integrated processing in analog VLSI silicon chips used a logarithm transformation prior to the surround formation. See "Analog VLSI and Neural Systems," C. Mead, Addison-Wesley, Reading, Mass., 1989. In an attempt to improve color constancy, the implementation of a color Retinex in analog VLSI technology is suggested by Moore et al., in "A Real-time Neural System for Color Constancy," IEEE Transactions on Neural Networks, Volume 2, pp. 237-247, March 1991. In Moore et al., the surround function was an exponential and final processing before display of the image required the use of a variable gain adjustment that set itself by finding the absolute maximum and minimum across all three color bands' signal values.

Central to these and other prior art Retinex methods is a Retinex-type algorithm. A perceived image S is a multiplication between the illumination L shed on visible surfaces and the respective reflectance R of the surfaces. Thus $$S = R \cdot L. \tag{1}$$

An underlying assumption behind Retinex algorithms is that the illumination L is an artifact. The illumination L is estimated and either removed completely: $S_1 = S/L = R$; or partially: $S_2 = S/f(L)$, where $(f)L$ is a function of the illumination. Estimating L from S is the main algorithmic and computational problem in Retinex algorithms.

Prior art Retinex-type algorithms are characterized by a two-module structure as shown in FIG. 1. A local statistics module 10 computes a smooth version L (i.e., the local statistics) of an input image S. Usually the smooth version L is a either a linear or a non-linear low-pass filter of the input image S. A manipulation module 20 then manipulates pixels in image S according to correspondingly located values in the local statistics L. In the case of Retinex-type algorithms, the local statistics L is usually attributed to the illumination, and is a local average or local envelope (maximum) of S. Sometimes the local statistics L may be a robust local average or robust local envelope of S, whereby robust means that pixels participating in determining the local average or envelope are on the same side of perceptually significant image edges as the center pixel. In the discussion that follows, L will be referred to as illumination; however L should be understood to encompass its more general meaning.

In FIG. 1, for convenience, the input image S is shown as the input to the Retinex algorithm. However, as is known to those of ordinary skill in the art, Retinex-type algorithms typically operate in the Log domain. As is also know to those of ordinary skill in the art, the illumination L is often referred to as an "envelope." The envelope can be smooth or piece-wise smooth.

Prior art Retinex algorithms also typically use linear space invariant low pass filters or partial differential equations for the illumination estimation module 10. Variants include slowly varying envelopes, i.e., local envelops instead of local averages, and robust low passes resulting in piece-wise smooth averages or envelopes, which might change abruptly whenever the input changes abruptly.

In the illumination manipulation module 20 module, the illumination L might be subtracted in part, for example, subtract half of the illumination L from the input image S. Alternative manipulation methods may reduce more of the input image S values as corresponding illumination L values increase.

Prior art Retinex algorithms may be applied to monochrome or color images. In the color image case, the Retinex algorithm may be applied to all planes, or only to the illumination L (e.g., the Y) plane.

In some prior art Retinex algorithms both the illumination estimation and illumination manipulation modules 10 and 20 are performed in an iterative filtering and subtraction scheme. In other prior art Retinex algorithms, the modules 10 and 20 are interleaved in a scale-space.

In an improved prior art Retinex-type algorithm, the illumination L is obtained from a sub-sampled version of the input image S. Such an improved Retinex-type algorithm is shown in block diagram form in FIG. 2. In FIG. 2, the Retinex-type algorithm includes linear illumination estimation module 30 and the illumination manipulation module 20. The image signal S is first input to a down sample module 32, where the image signal S is sub-sampled using techniques known to those of ordinary skill in the art to produce sub-sampled images S'. For example, the sub-sampling may involve averaging blocks of four pixels in the image S. The linear illumination estimation module 30 then generates an estimate of the illumination L' based on the sub-sampled image S'. The illumination L' is then provided to an up-sample module 34, and an estimation of the illumination L" of the entire image S is produced, using interpolation and similar techniques known to those of ordinary skill in the art.

Sub-sampling and subsequent interpolation are intended to speed up the computationally intensive Retinex process. However, in the Retinex-type algorithm illustrated in FIG. 2, the interpolation is performed on a set of smooth, low resolution intermediate images (i.e., the images S'), using the high resolution input image S to select corresponding output pixels from the resulting set of high resolution images L". This interpolation scheme avoids the need to interpolate a low resolution piece-wise smooth illumination image. Thus, the Retinex-type algorithm shown in FIG. 2 can only be used where the algorithm's computationally intensive operation produces a smooth function (either an average or an envelope). An example of such a Retinex-type algorithm is described in F. Durand, and J. Dorsey, "Fast Bilateral Filtering for the Display of High Dynamic Range Images", preprint in http://graphics.lcs.mit.edu/~fredo/DurandBilateral.pdf. Thus, the Retinex-type algorithm shown in FIG. 2 cannot be used for robust Retinex-type algorithms, other than for those Retinex-type algorithms employing bilateral filtering. Furthermore, the computationally intensive operation of the Retinex-type algorithm is repeated several times, once for each of the intermediate images S'.

SUMMARY

What is disclosed is an apparatus for speeding up Retinex-type processing of an input image. The apparatus includes a down sample module having a sub-sampling algorithm, where sub-sampled images of the input image are produced, and a non-linear illumination estimation module that receives the sub-sampled images and produces corresponding interim illumination estimations. Finally, the apparatus includes an up sample module including one or more up-sampling algorithms. The interim illumination estimations are interpolated to produce an illumination estimation, and the illumination estimation is usable to perform a Retinex correction to the input image.

Also disclosed is a method for speeding up Retinex-type processing of a high resolution input image. The method includes the steps of sub-sampling the high resolution input image to produce one or more low resolution input images, estimating an illumination of the low resolution images, where an interim illumination estimation is generated for each low resolution input image, and up-sampling the interim illumination estimation, where an illumination estimation suitable for Retinex correction is generated.

DESCRIPTION OF THE DRAWINGS

The detailed description will refer to the following drawings in which like numbers refer to like items, and in which:

FIGS. 1 and 2 are block diagrams of prior art Retinex-type algorithms;

FIG. 3 is a block diagram of an embodiment of a Retinex-type algorithm that is an improvement over the prior art;

FIGS. 4*a* and 4*b* are block diagrams of two possible up-sampling algorithms used with the Retinex algorithm of FIG. 3;

FIGS. 7*a* and 7*b* are block diagrams of up-sampling combinations to balance blurring artifacts and over-sharpening artifacts.

DETAILED DESCRIPTION

Figure 5A:
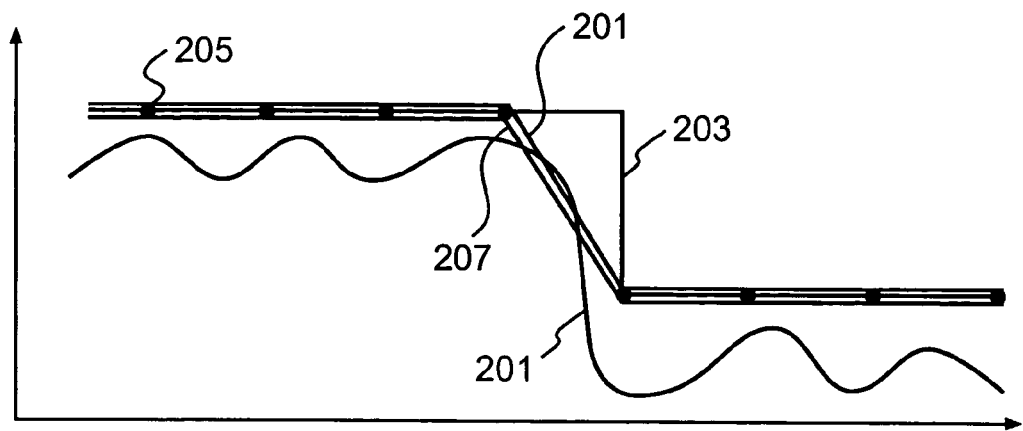
FIGS. 5*a*-5*c* are schematic illustrations of signals through the two up-sampling algorithms of FIGS. 4*a* and 4*b*.

The description that follows will use the term "linear" according to one of two in two different meanings:
1. Linear algorithms (e.g., a linear convolution) as opposed to non-linear algorithms.
2. Linear computational complexity as opposed to, for example, square or logarithmic complexity. Specifically, the description will refer to linear or sub-linear complexity with respect to the input complexity, namely, is the number of computationally intensive operations proportional to the number of input pixels, or is it proportional to that number divided by some sampling factor.

A major problem with using robust Retinex algorithms on sub-sampled data is that the piece-wise smooth illumination estimation results of robust Retinex algorithms do not interpolate well, and artifacts are likely in the output illumination. To overcome this problem, an improved robust Retinex algorithm disclosed herein avoids artifacts when a robust Retinex illumination estimation is interpolated, thereby enabling a significant processing speed-up over prior art Retinex algorithms.

In both robust and non-robust illumination estimation modules sub-sampling presents a question of whether the illumination estimation L' of the sub-sample S' is a local maximum or a local average. In robust illumination estimation modules, artifacts are introduced during up-sampling, or interpolation. However, when the sampling factor is small relative to the size and viewing distance of the output image, the artifacts sharpen the output image compared to non-sub-sampled equivalents. Thus, up to a certain extent, these artifacts can be considered as an advantage. In robust illumination estimation modules, when sub-sampling is relatively strong, over-sharp and halo artifacts created during the required up sampling may degrade the quality of the output image. In these cases an alternative, non-standard interpolation approach, which will be described in detail later, may be used in the up-sampling stage. However, this alternative up-sampling creates blurring artifacts. Finally, the up-sampling algorithms may be combined in one of at least the following ways to balance the sharpening of one interpolation algorithm against the blurring of another interpolation algorithm:

Average the two up-sampling algorithms according to the required total sharpening.

Averaging-rate changes throughout the image, according to local properties of the image S.

Cascade the two up-sampling algorithms. The resulting relative interpolation rate determines the total sharpening.

Cascaded rate changes throughout the image, according to the local properties of the image.

FIG. 3 is a block diagram of an embodiment of an improved Retinex algorithm 100 that speeds up Retinex processing. The Retinex algorithm 100 processes input signal S and produces output signal R. The Retinex algorithm 100 includes down-sampling module 110, which receives the input signal S and performs down-sampling according to a down-sampling algorithm (not shown in FIG. 3) to produce one or more sub-sampled images S'. The sub-sampled images S' are then provided to non-linear illumination estimation module 120, which produces an interim illumination estimation L' for each of the sub-sampled images S'. The interim illumination estimations L' are provided to up-sampling module 140, which uses an up-sampling algorithm (not shown in FIG. 3) to produce a full size illumination estimation L". The illumination estimation L" is then provided to illumination manipulation module 180, which also receives the input signal S. The illumination manipulation module 180 processes the received illumination estimation L" and the input signal to produce output signal R.

The down-sampling module 110 filters and sub-samples the input image S. In the case where the illumination L is an envelope rather than a local average, the sub-sampling performed by the down-sampling module 110 may be a sampling of a local maximum of the input image S. Alternatively, for large sampling factors, a combination of sub-sampling algorithms may be used. For example, sub-sampling by the down-sampling module 110 may include sampling by a factor of $s_1$ using averaging (local-maximum), and by a factor of $s_2$ using local-maximum (averaging), for an overall sampling factor of $S=s_1 * s_2$.

When the non-linear illumination estimation L is a non-robust envelope, local maximum sampling may be preferable. Averaging reduces the contrast of small bright structures (in this context, small is relative to the sampling factor). In some cases, this type of artifact may be preferred in order to reduce potential specularities in the output image R. In this case, averaging should not exceed the expected size of the specularities. When the sampling factor is larger, the remaining portions of the input image S should be down sampled using local maxima.

In case the non-linear illumination estimation L is a robust envelope, using local maximum sampling might increase halo artifacts, as discussed above. The combination of this constraint on the local-maximum-based sampling factor, and the constraint on the averaging-based sampling factor may limit the sampling factor of non-robust envelope modules.

The up-sampling module 140 uses an up-sampling algorithm as known in the art of image and signal processing. In some up-sampling algorithms and in the appropriate up-scaling rates, new samples are interpolated between low-resolution input samples. Standard up-sampling algorithms include nearest neighbor, bi-linear, and bi-cubic interpolations. However, in the Retinex algorithm 100, details in the high-resolution output image R cannot mismatch details in the original input image S (inaccurately placed details will result in artifacts). The solution to this problem is to design the up-sampling algorithm so that the interpolation does not add details, or else use the input image S as a guide to detail placement.

FIG. 4 details the two design options for the algorithm 150. In FIG. 4a, illumination interpolation algorithm 150' includes interpolation routine 152 and local maximum routine 154. The interpolation routine 152 receives a low-resolution illumination estimation and a sampling rate, to produce high-resolution illumination values. The interpolation routine 152 may be, for example, bilinear interpolation. Other interpolation methods may be used with the interpolation routine 152 so long as those methods do not estimate or create new details. When the estimated illumination L is an envelope rather than an average, and in rare cases in which the interpolated illumination will be below the high resolution input image, the envelope constraint is enforced explicitly using the maximum routine 154.

FIG. 4b is a block diagram of the difference interpolation-algorithm 150". The algorithm 150" includes the interpolation routine 152, which performs the same functions as described above with respect to the algorithm 150'. However, the algorithm 150" interpolates a high-resolution difference (between the illumination L and the input image S) and low-resolution values using the same interpolation methods as described above with respect to FIG. 4a. The algorithm 150" includes adder 153, which combines the low-resolution input (i.e., the sub-samples of the input image) and the low resolution interim illumination estimation L. The combined value is then provided to the interpolation routine 152. The interpolated difference output is then combined in adder 155 with the high resolution image input.

Figure 5B:
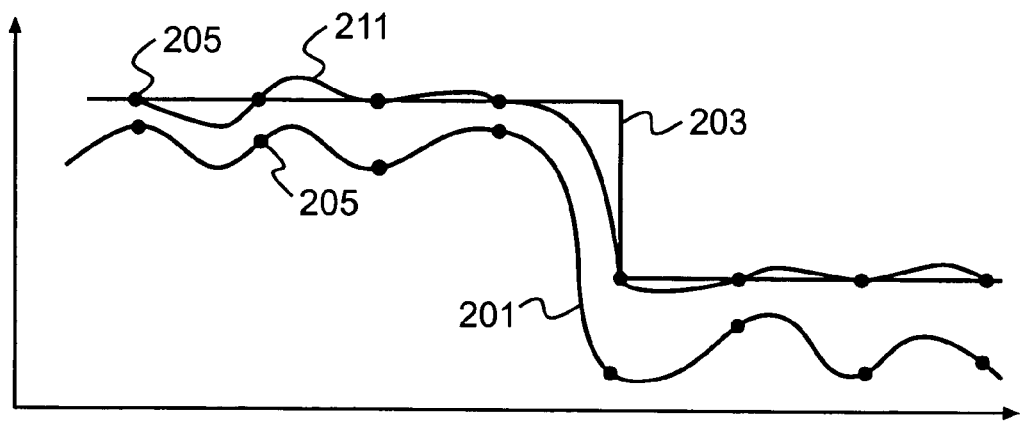
Figure 5C:
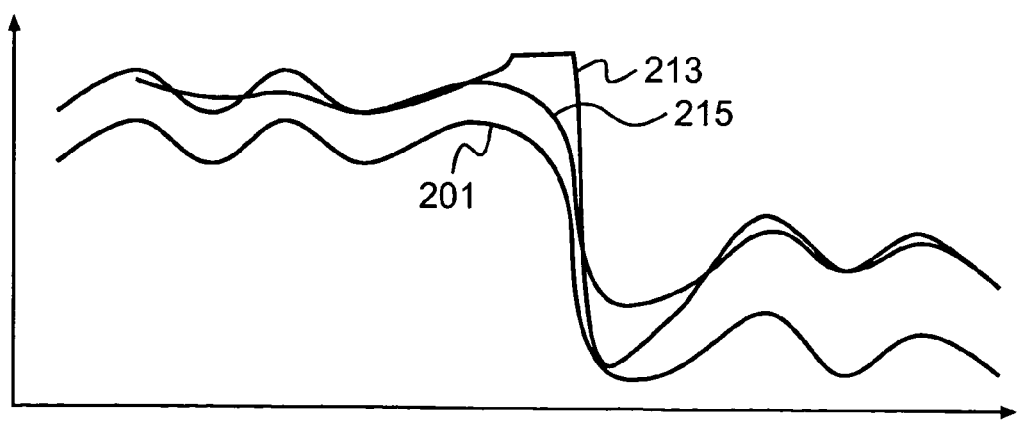

FIG. 5 is a schematic illustration of signals through the two interpolation algorithms 150' and 150". In FIGS. 5a, 5b and 5c, the high-resolution input image S is shown as curve 201, and the corresponding low resolution envelope L is shown as curve 203. Low-resolution samples are shown as dots 205 in FIG. 5b, and are interpolated to form the piece-wise constant curve 203. Piece-wise linear interpolation, which might result from the algorithm 150' described in FIG. 4a is shown in FIG. 5a as curve 207. Overlapping curve 207 is a final output image R showing the results of clipping, and depicted as curve 209. For clarity, the curves 207 and 209 have been slightly displaced, in FIG. 5a.

FIG. 5b shows the signals for difference interpolation algorithm 150" Besides the high resolution input image curve 201 and the low resolution envelope curve 203, a difference interpolation is shown as curve 211.

Comparing the signals in FIGS. 5a and 5b shows that the linear interpolation curve 207 of FIG. 5a has no new details, whereas the difference interpolation curve 211 of FIG. 5b has many of the input image details (i.e., the curve 211 is in good alignment with the input image curve 201).

Returning to FIG. 3, the illumination manipulation module 180 executes routines that essentially produce a difference between the illumination estimation L and the input image S. As a result, the output R of the illumination manipulation module 180 will have properties that are inverted from those of the illumination image L. This condition is shown schematically in FIG. 5c, where the curve 213 illustrates that the output of an illumination interpolation algorithm 150' is considerably sharper than an output of the difference interpolation algorithm 150", shown as curve 215.

Figure 6C:
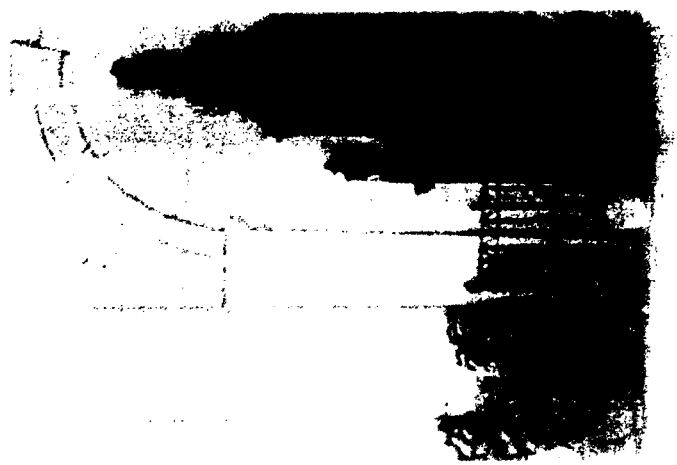
FIGS. 6*a*-6*f* present an example of a sub-sampled non-linear Retinex algorithm.
Figure 6B:
Figure 6A:
Figure 6F:
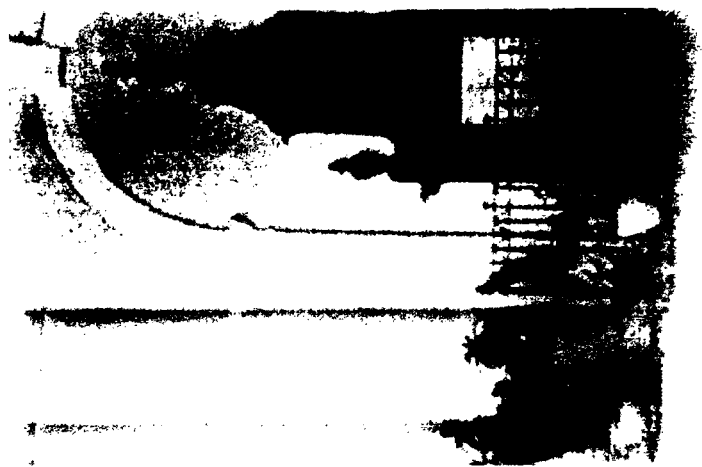
Figure 6E:
Figure 6D:

An example of a sub-sampled non-linear Retinex algorithm is shown in FIG. 6, which shows various parts of a patio, where the interior part includes a back wall, an altar, and a fence, among other features FIG. 6a presents an input image. FIG. 6b presents a zoomed-in part of the input image of FIG. 6a. FIG. 6c presents the 1:5 illumination-interpolation of the estimated illumination of the image sub-sampled (1:5) from the zoomed-in part shown in FIG. 6b. FIG. 6d presents a Retinex correction corresponding to FIG. 6c. FIG. 6e presents the 1:5 difference interpolation of the estimated illumination of the image sub-sampled (1:5) from the zoomed-in part of the input image of FIG. 6b. FIG. 6f presents a Retinex correction corresponding to FIG. 6e. Note that the sharper Retinex output shown in FIG. 6d corresponds to the blurred interpolated illumination of FIG. 6c, and the less sharp Retinex output shown in FIG. 6f corresponds to the sharper difference interpolation of FIG. 6e.

Choice of the interpolation algorithm depends on imaging intent and required interpolation rate. While usually sharp images are desirable, in some applications, over sharpening is a problem. Furthermore, for large sampling rates, artifacts become halos rather than sharpening artifacts. In all these cases, the blurring artifacts of difference interpolation can be balanced against the artifacts of illumination interpolation. Alternatives include: 1) averaging the illumination images from illumination and difference interpolations; and 2) cascading the illumination and difference interpolations, such that the total interpolation rate is the required interpolation.

FIGS. 7a and 7b are block diagrams of the two alternative algorithms, average algorithm 220 and cascade algorithm 230, respectively, for balancing artifacts. For algorithm 230 to perform the required up scaling, $R_O = R_I * R_D$, where $R_O$ is an overall sampling rate, $R_I$ is an interpolation sampling rate, and $R_D$ is a difference sampling rate.

In FIG. 7a, the average algorithm 220 uses average routine 157 to obtain a weighted average of the illumination and difference interpolation algorithms 150' and 150". The average routine 157 applies weight $W_D$ to the difference interpolation result and weight $W_I$ to the illumination interpolation result. Since $W_I + W_D = 1$, the weights $W_i$ play a similar role to rate ratios $R_i/R_O$ in algorithm 230.

In FIG. 7b, cascade algorithm 230 first applies the difference interpolation algorithm 150" to the low-resolution illumination followed by the illumination interpolation algorithm 150'.

Figure 8C:
FIGS. 8*a*-8*c* present results of combining up-sampling algorithms compared to the results of using the up-sampling algorithms individually.
Figure 8B:
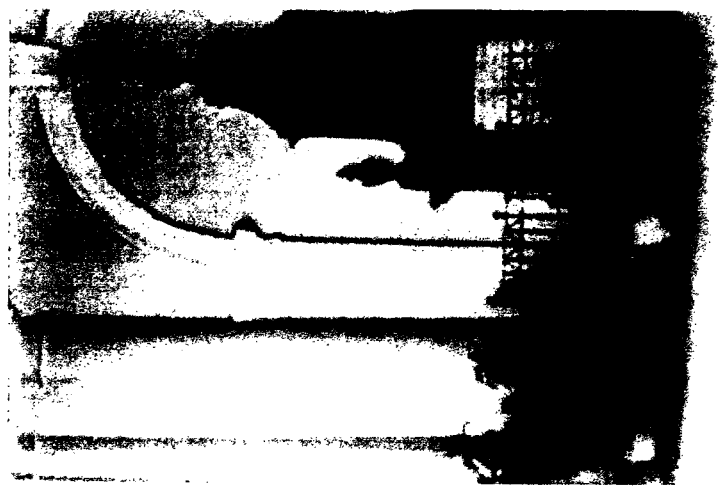
Figure 8A:
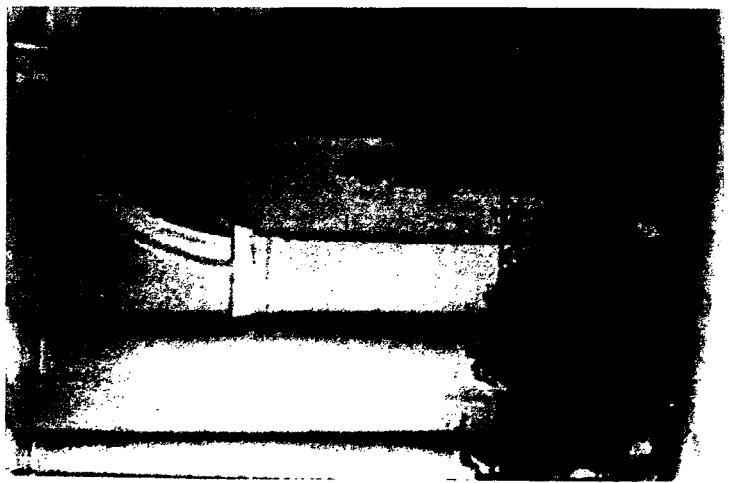

FIG. 8a shows the result of application of the illumination interpolation algorithm 150' and FIG. 8b shows the result of application of the difference interpolation algorithm 150". FIG. 8c shows the result of applying the average algorithm 220, with $W_I = W_D = 0.5$.

Different ways to combine the two interpolation algorithms 150' and 150" may be motivated by the fact that different artifacts are significant in different locations in an image. For example, halos are more visible near strong edges for which one side is in the mid-tones (high and low tones have less distinctive halos). This is evident in FIGS. 6c and 6d, where the halos on the dark altar-piece are less noticeable than those on the back wall. Also, at texture regions halos are much less visible, as, for example, in the case of the textured dark fence against the wall versus the edge between the altar-piece and the wall. In such cases it might be preferable to modify the rates $R_i$ or the weights $W_i$ locally, according to image properties.

I claim:

1. An apparatus for speeding up Retinex-type processing of an input image, comprising:
   a down-sampling module configured to produce one or more sub-sampled images of the input image;
   a non-linear illumination estimation module that receives the sub-sampled images and produces corresponding interim illumination estimations;
   an up-sampling module configured to receive the input image and to interpolate the interim illumination estimations to produce an illumination estimation by using the input image as a guide in the interpolation, and wherein the illumination estimation is usable to perform a Retinex-type correction to the input image.

2. The apparatus of claim 1, wherein the up-sampling module is configured to implement an interpolation routine that receives the interim illumination estimations and a sampling rate, and produces the illumination estimation.

3. The apparatus of claim 2, wherein the up-sampling module is further configured to enforce an envelope constraint.

4. The apparatus of claim 1, wherein the up-sampling module is further configured to receive the difference of the sub-sampled images and the interim illumination estimations, and a sampling rate and to produce an interpolated difference; and
   wherein the up-sampling module is further configured to add the interpolated difference and the input image.

5. The apparatus of claim 1, wherein the up-sampling module is further configured to product a difference-interpolated illumination estimation, to produce an illumination-interpolated illumination estimation, and
   to average the illumination-interpolated illumination estimation and the difference-interpolated illumination estimation to produce the illumination estimation.

6. The apparatus of claim 5, wherein the up-sampling module is further configured to apply a difference weight to the difference-interpolated illumination estimation and to apply an illumination weight to the illumination-interpolated illumination estimation.

7. The apparatus of claim 6, wherein the difference weight and the illumination weight change from location to location in the image such that for every location the difference weight and the illumination weight sum up to 1.

8. The apparatus of claim 6, wherein the difference weight and the illumination weight each equal 0.5.

9. The apparatus of claim 1, wherein the up-sampling module is further configured to implement an interpolation cascade,
   said interpolation cascade being configured to perform a difference interpolation and an illumination interpolation.

10. The apparatus of claim 9, wherein the up-sampling module is further configured to perform the illumination interpolation following the difference interpolation.

11. The apparatus of claim 9, wherein the up-sampling module is further configured to calculate a difference interpolation rate $R_D$, an illumination interpolation rate $R_1$, and an overall interpolation rate $R_O$, and wherein the interpolation rates $R_D$, $R_1$, $R_O$ change from location to location in the image.

12. The apparatus of claim 11, wherein for every location in the image the interpolation rates $R_D$, $R_1$ and $R_O$ obey $R_D * R_1 = R_O$.

13. A method for speeding up Retinex processing of a high resolution input image, comprising:
   producing one or more low resolution input images by sub-sampling the high resolution input image;
   generating an interim illumination estimation for each of the one or more low resolution input images;
   generating an illumination estimation suitable for Retinex-type correction by up-sampling the interim illumination estimations, wherein generating the illumination estimation comprises combining the input image and the interim illumination estimations; and
   producing a Retinex-corrected output from the combined input image and the illumination estimation.

14. The method of claim 13, wherein generating an illumination estimation further comprises:
   receiving the interim illumination estimations and a sampling rate to produce the illumination estimation; and
   enforcing an envelope requirement by applying a local maximum routine.

15. The method of claim 13, wherein generating an illumination estimation by up-sampling the interim illumination estimations further comprises:
   subtracting the one or more low resolution images and the interim illumination estimations to obtain difference images;
   receiving the difference images and a sampling rate; and
   adding the illumination estimation and the input image.

16. The method of claim 13, wherein generating an illumination estimation by up-sampling the interim illumination estimations further comprises:
   producing a difference interpolated illumination estimation to the interim illumination estimations;
   producing an illumination interpolated illumination estimation; and
   wherein generating the illumination estimation further comprises averaging the illumination interpolated illumination estimation and the difference interpolated illumination estimation.

17. The method of claim 16, wherein generating the illumination estimation further comprises:
   applying a difference interpolation weighting factor to the difference interpolated illumination estimation; and
   applying an illumination interpolation weighting factor to the illumination interpolated illumination estimation.

18. The method of claim 17, wherein the difference interpolation weighting factor and the illumination interpolation weighting factor sum to 1.

19. The method of claim 13, wherein generating the illumination estimation further comprises:
   implementing a difference interpolation module; and
   applying an illumination interpolation weighting factor module.

20. A method for speeding up Retinex processing of an image, comprising:

producing low resolution images by sub-sampling the image;
generating an interim illumination estimation for each of the low resolution images;
producing a difference interpolated illumination estimation by implementing a difference interpolation module on the interim illumination estimations;
producing an illumination interpolated illumination estimation by implementing an illumination interpolation module; and averaging the illumination interpolated illumination estimation and the difference interpolated illumination estimation to produce the illumination estimation.

21. The apparatus of claim 1, further comprising an illumination manipulation module, wherein the input image and the illumination estimation are combined to produce an output image.

* * * * *

UNITED STATES PATENT AND TRADEMARK OFFICE
CERTIFICATE OF CORRECTION

| | | |
|---|---|---|
| PATENT NO. | : 7,760,943 B2 | Page 1 of 1 |
| APPLICATION NO. | : 10/675944 | |
| DATED | : July 20, 2010 | |
| INVENTOR(S) | : Doron Shaked | |

It is certified that error appears in the above-identified patent and that said Letters Patent is hereby corrected as shown below:

In column 7, line 42, in Claim 5, delete "product" and insert -- produce --, therefor.

In column 8, line 3, in Claim 11, delete "$R_1$," and insert -- $R_I$, --, therefor.

In column 8, line 5, in Claim 11, delete "$R_1$," and insert -- $R_I$, --, therefor.

In column 8, line 8, in Claim 12, delete "$R_1$" and insert -- $R_I$ --, therefor.

In column 8, line 9, in Claim 12, delete "$R_1$" and insert -- $R_I$ --, therefor.

Signed and Sealed this
Twenty-second Day of February, 2011

David J. Kappos
*Director of the United States Patent and Trademark Office*